ated by examiner

(12) United States Patent
Casey et al.

(10) Patent No.: US 8,089,043 B2
(45) Date of Patent: Jan. 3, 2012

(54) SYSTEMS AND METHODS FOR CALIBRATING TIME ALIGNMENT FOR A POSITRON EMISSION TOMOGRAPHY (PET) SYSTEM

(75) Inventors: Michael E. Casey, Louisville, TN (US);
Mu Chen, Knoxville, TN (US);
Timothy G. Gremillion, Knoxville, TN (US); Charles H. Hayden, Jr., Knoxville, TN (US); Mark W. Lenox, Harriman, TN (US); Vladimir Y. Panin, Knoxville, TN (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 205 days.

(21) Appl. No.: 12/628,259

(22) Filed: Dec. 1, 2009

(65) Prior Publication Data

US 2011/0127413 A1 Jun. 2, 2011

(51) Int. Cl.
*G01D 18/00* (2006.01)
(52) U.S. Cl. .................................................. 250/252.1
(58) Field of Classification Search .. 250/363.01–363.1, 250/252.1
See application file for complete search history.

(56) References Cited

U.S. PATENT DOCUMENTS 5,272,344 A * 12/1993 Williams .................. 250/363.03
7,211,799 B2 5/2007 Heukensfel
7,345,281 B2 3/2008 Jansen et al.

OTHER PUBLICATIONS

Thompson et al., "A central position source to perform the timing alignment of detectors in a PET scanner," 2005, IEEE Transactions on Nuclear Science, vol. 52, No. 5, pp. 1300-1304.*
Aykac et al., "Timing performance of Hi-rez Detector for Time-Of-Flight (TOF) PET,", 2006, IEEE Transactions on Nuclear Science, vol. 53, No. 3, pp. 1084-1089.*
Ullisch et al., "Multi-CFD Timing Estimators for PET Block Detectors," 2007, IEEE Transactions on Nuclear Science, vol. 54, No. 1, pp. 55-59.*
Lenox, M.W., et al., Digital Time Alignment of High Resolution PET Inveon Block Detectors, Nuclear Science Symposium Conference Record, IEEE, Oct. 29-Nov. 1, 2006, vol. 4, pp. 2450-2453.
Perkins, A.E., et al., Time of Flight Coincidence Timing Calibration Techniques Using Radioactive Sources, Nuclear Science Symposium Conference Record, IEEE, Oct. 23-29, 2005, vol. 5, pp. 2488-2491.

* cited by examiner

*Primary Examiner* — Kiho Kim
(74) *Attorney, Agent, or Firm* — Peter L. Kendall

(57) ABSTRACT

A representative positron emission tomography (PET) calibration system includes a PET scanner having a ring detector, a phantom that is placed at approximately the center of the ring detector, and a time alignment calibration manager that is coupled to the PET scanner. The time alignment calibration manager detects coincidence events from the phantom, calculates position of time of flight events from the ring detector based on the detected coincidence events, and calculates time offsets for the ring detector using a mean value calculation based on the calculated position of the time of flight events.

6 Claims, 5 Drawing Sheets

SYSTEMS AND METHODS FOR CALIBRATING TIME ALIGNMENT FOR A POSITRON EMISSION TOMOGRAPHY (PET) SYSTEM

TECHNICAL FIELD

The present disclosure is generally related to nuclear medical imaging and, more particularly, is related to systems and methods for calibrating time alignment for a positron emission tomography (PET) system.

BACKGROUND

Time alignment refers to the process of calibrating a PET scanner for any residual time offsets between two detectors in coincidence. While the hardware and electronics are matched as carefully as possible, some timing differences can remain due to the different paths in positron detection. These timing differences reduce the performance in a Time of Flight (TOF) PET scanner since the TOF PET scanner detects the position along a line of response (LOR).

Desirable in the art is an improved calibration system that would improve upon the calibration of the TOF PET scanner.

SUMMARY

A representative positron emission tomography (PET) calibration system includes a PET scanner having a ring detector, a phantom that is placed at approximately the center of the ring detector, and a time alignment calibration manager that is coupled to the PET scanner. The time alignment calibration manager detects coincidence events from the phantom, calculates positions of time of flight events from the ring detector based on the detected coincidence events, and calculates time offsets for the ring detector using a mean value calculation based on the calculated position of the time of flight events.

Other systems, devices, methods, features of the present disclosure will be or will become apparent to one skilled in the art upon examination of the following figures and detailed description. It is intended that all such systems, devices, methods, and features be included within the scope of the present disclosure, and be protected by the accompanying claims.

BRIEF DESCRIPTION OF DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, the reference numerals designate corresponding parts throughout the several views. While several embodiments are described in connection with these drawings, there is no intent to limit the disclosure to the embodiment or embodiments disclosed herein. On the contrary, the intent is to cover all alternatives, modifications, and equivalents.

DETAILED DESCRIPTION

Exemplary systems are first discussed with reference to the figures. Although these systems are described in detail, they are provided for purposes of illustration only and various modifications are feasible. After the exemplary systems are described, examples of flow diagrams of the systems are provided to explain the manner in which a positron emission tomography system can be calibrated.

Figure 1:
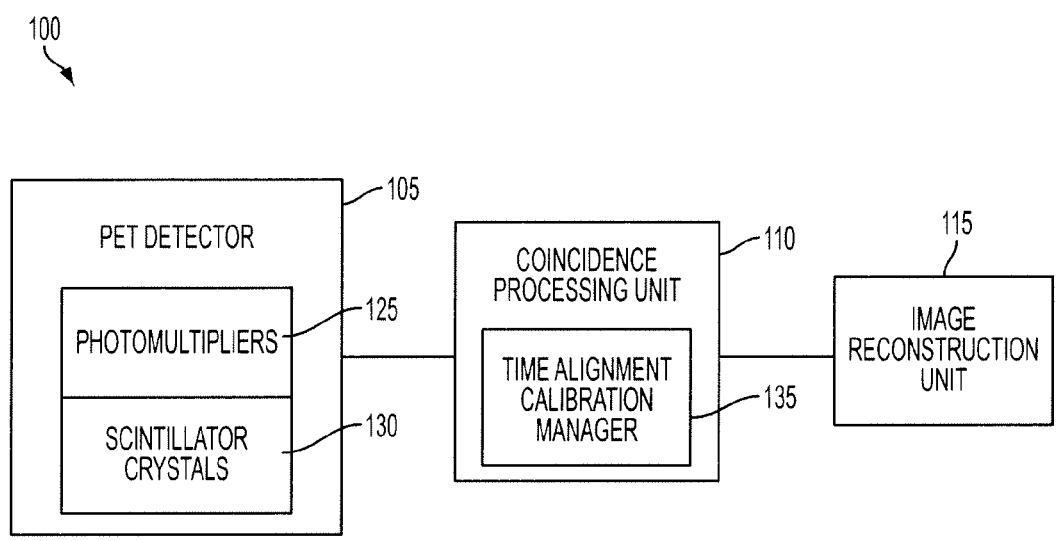
FIG. 1 is a high-level block diagram of a positron emission tomography (PET) system having a time alignment calibration manager in accordance with an embodiment of the present disclosure.

FIG. 1 is a high-level block diagram of a positron emission tomography system 100 having a time alignment calibration manager 135 in accordance with an embodiment of the present disclosure. The positron emission tomography system 100 includes a positron emission tomography detector 105 having scintillator crystals 130 and photomultipliers 125. In general, a living subject is injected with a short-lived radioactive tracer isotope (e.g., usually into blood circulation) before conducting a positron emission tomography scan. The tracer isotope is for example fluorodeoxyglucose (FDG), which is a type of sugar. During the positron emission tomography scan, data is recorded from the tracer-concentrated tissue as the tracer isotope decays.

As the tracer-concentrated tissue undergoes positron emission decay, the tissue emits a positron, which is an antiparticle of the electron with opposite charge. The positron eventually collides with an electron, producing a pair of annihilation (gamma) photons moving in opposite directions. The gamma photons are detected when they reach the scintillator crystals 130 in the positron emission tomography detector 105, creating a burst of light which is detected by the photomultipliers 125. The pair of photons move in approximately opposite direction and are processed to determine whether the detected pair of photons originated from a coincidence event by the coincidence processing unit 110. If so, signals representing the detected pair of photons are sent to the image reconstruction unit 115 for an image data that is generated using mathematical image reconstruction procedures.

The coincidence processing unit 110 further includes the time alignment calibration manager 135, which facilitates calibrating the positron emission tomography detector 105 for any residual time offsets between two detectors in coincidence. Although the time alignment calibration manager 135 is shown to be a part of the coincidence processing unit 110, the time alignment calibration manager 135 can be a separate independent unit or part of another component of the positron emission tomography system 100, such as the positron emission tomography detector 105 or image reconstruction unit 115. The process of calibrating the time alignment for the positron emission tomography detector 105 is further described in connection with FIGS. 2-5.

Figure 2:
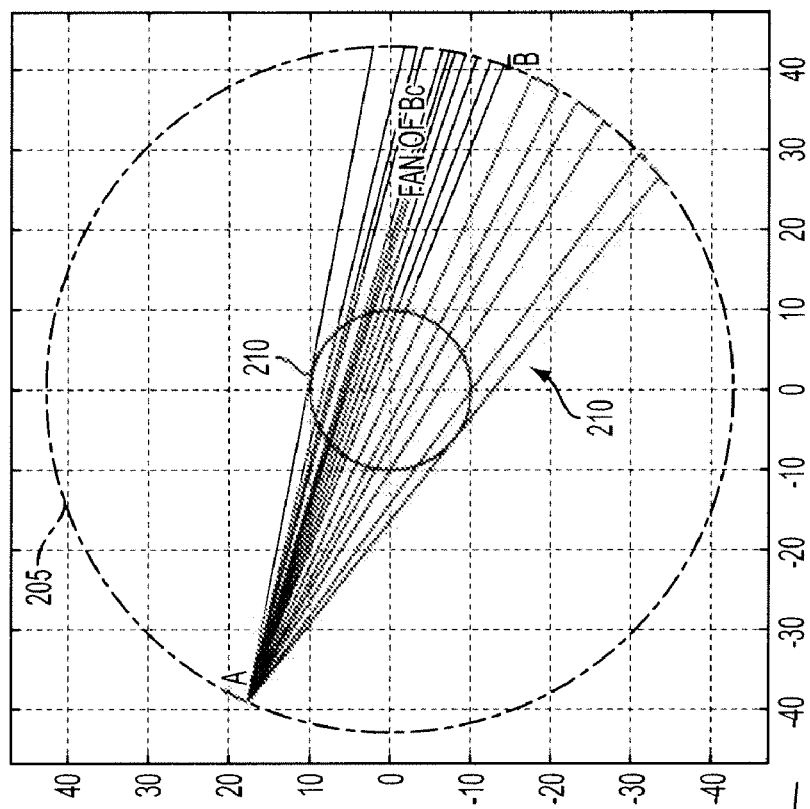
FIG. 2 is a perspective view of a positron emission tomography detector and a two-dimensional front view of a ring detector that is used with a phantom in accordance with an embodiment of the present disclosure.
Figure 2:
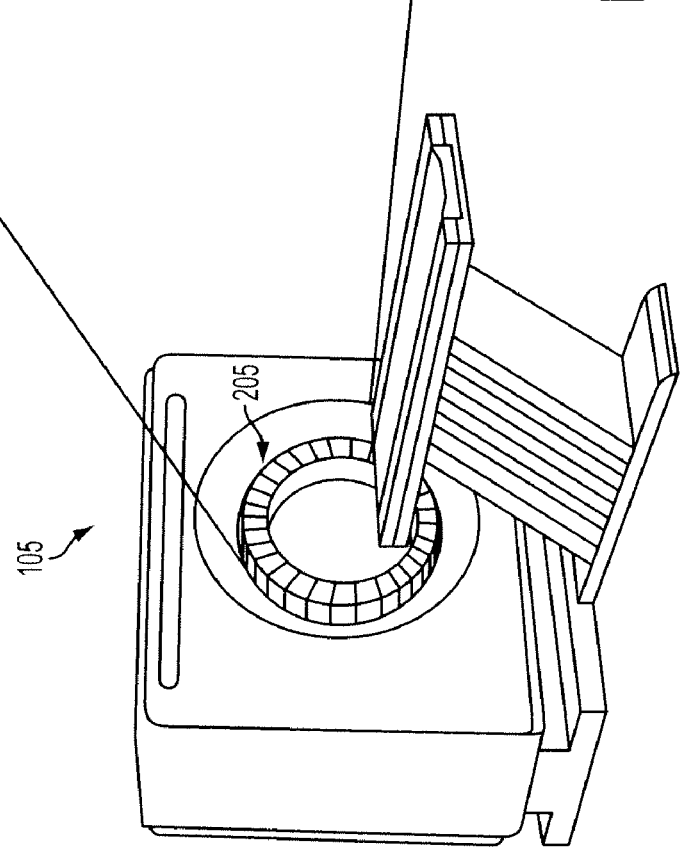
Figure 3:
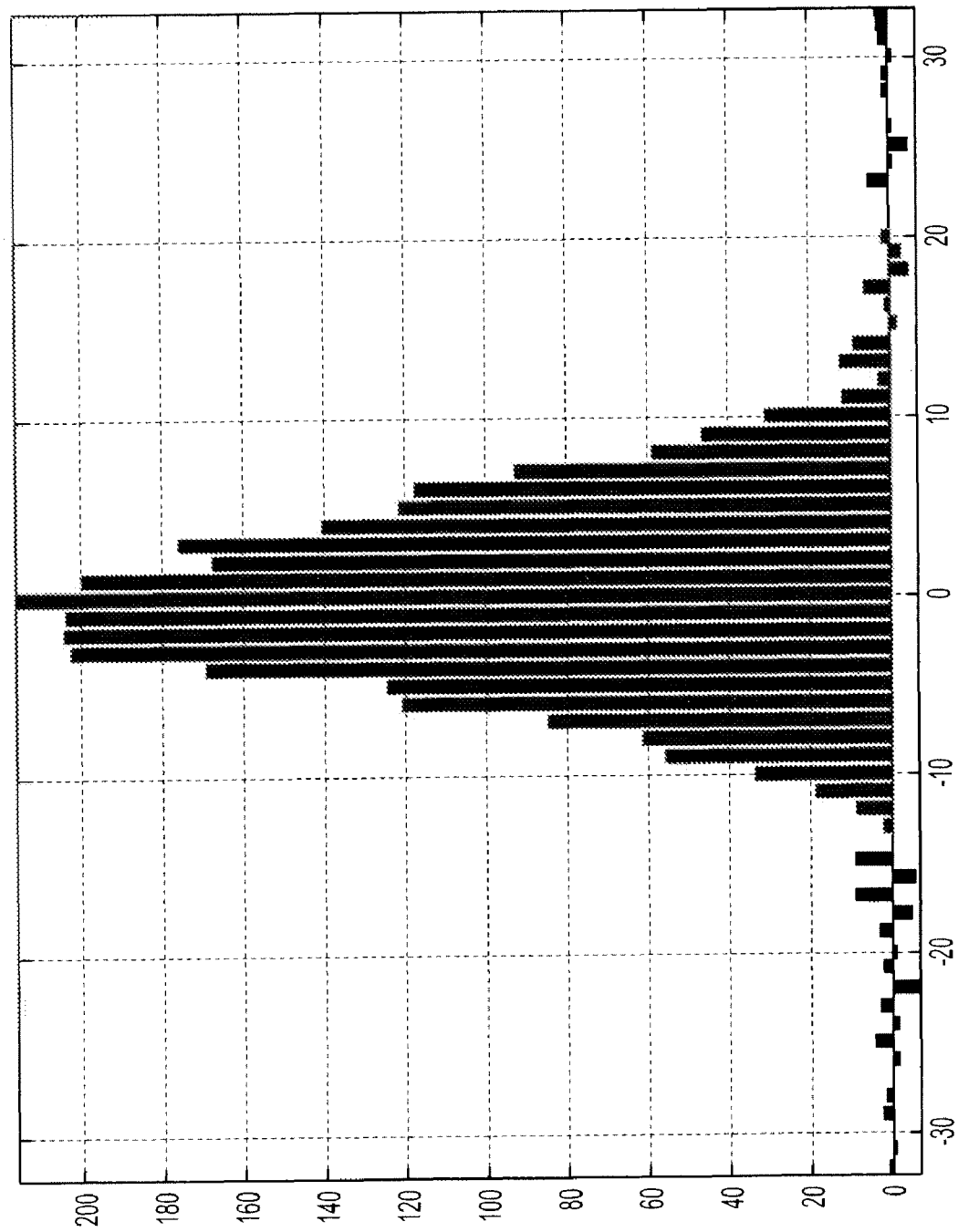
FIG. 3 is a graph that illustrates an exemplary histogram from a PET scan of a phantom in accordance with an embodiment of the present disclosure.

FIG. 2 is a perspective view of a positron emission tomography detector having a ring detector 205 in accordance with an embodiment of the present disclosure. In this example, the ring detector 205 is a PET gantry of radius 427.6 mm with 672 crystals/gaps (e.g., crystals A and B). The ring detector 205 is expanded to show an example line of response (LOR) from crystal A to crystal B.

The time of flight (TOF) event is a time difference of a coincidence event that reaches crystal A minus the time the coincidence event that reaches crystal B. One skilled in the art would appreciate that a position of the time of flight event can be calculated from the time difference of the coincidence. The position of the time of flight event can be determined somewhere on the LOR (line of response).

Positive time direction is generally from crystal A to crystal B, and since the LOR of crystal A is shorter than the LOR of crystal B in this example, this $TOF_A$ event is negative. Equations 1 and 2 show the TOF events of crystals A and B, respectively.

$$TOF_A = T_A - T_B \quad \text{(Eq. 1)}$$

It follows that:

$$TOF_B = T_B - T_A = -TOF_A \quad \text{(Eq. 2)}$$

In general, the time alignment process assumes that a phantom 210 is placed in the center of the field of view (FOV) during a scan of several million events. The phantom 210 can be a 20 cm phantom, for example. The time alignment process collects a scan of tens of millions of counts from the phantom 210. This is illustrated in two dimensional, as shown in the expanded view of the ring detector 205. A histogram of all these events is generally symmetric about the center of the crystal A time offset, such as that shown in FIG. 3, which illustrates a typical histogram of this type.

Several methods can be used to calculate the center of this histogram with varying degrees of accuracy. The accuracy of these methods can be dependent on the number of events collected in the histogram. One method, among others, is to use a simple mean value calculation, reducing computation complexity and time. So the time offset of any crystal, $Ot_A$, can be calculated using Equation 3 as follows:

$$Ot_A = \frac{1}{n} \sum_n TOF_A, \quad \text{(Eq. 3)}$$

where n represents the coincidence events that contain crystal A. For example, the simple mean value calculation of 50 M count scan with a 20 cm uniform phantom provides mean value solution of approximately 40 million Prompts and 10 million Delays, and thus 30 million Trues, or about 1,000 events per crystal (for the 32,448 crystals in a 4 ring PET scanner).

The mean value solution can be used in an iterative time alignment algorithm. For example, each crystal in the gantry can be viewed as crystal A with a fan of B crystals. The iterative solution for each offset is shown in Equation 4 as follows:

$$Ot_A^i = Ot_A^{i-1} + \frac{1}{n} \sum_n TOF_A^i. \quad \text{(Eq. 4)}$$

During the iterative computation process, a correction value for the time offset is determined in a previous iteration computation for this A crystal and for each B crystal in the fan and included in a current iteration computation. Because the at least one correction value for the time offset is included during the iteration computation process, a more general definition of this TOF mean is shown in Equation 5 as follows:

$$TOF_A^i = (T_A - Ot_A^{i-1}) - (T_B - Ot_B^{i-1}). \quad \text{(Eq. 5)}$$

For the first iteration, or i=1, $Ot_A^0 = Ot_B^0 = 0$, since all the time offsets are zeroed in the gantry before the start of the calibration process. On this iteration, the offsets are calculated for all crystals A. For iterations i=2 to 7, each iteration includes the correction values defined above but can be updated ⅓ of the A crystals in the gantry. The ring detector 205 can be described using a clock as a reference, particularly using the hour increments of 1-12. Thus, the updated thirds can be divided into 1-4 o'clocks, 5-8 o'clocks, and 9-12 o'clocks. These six subsequent iterations allow each offset to be updated twice. The solution can sufficiently converge by that time. One skilled in the art would appreciate that other iterative processes can be implemented to achieve a solution to Equation 5. The above algorithm has shown to obtain the solution approximately 5 times faster than the conventional algorithm.

Figure 4:
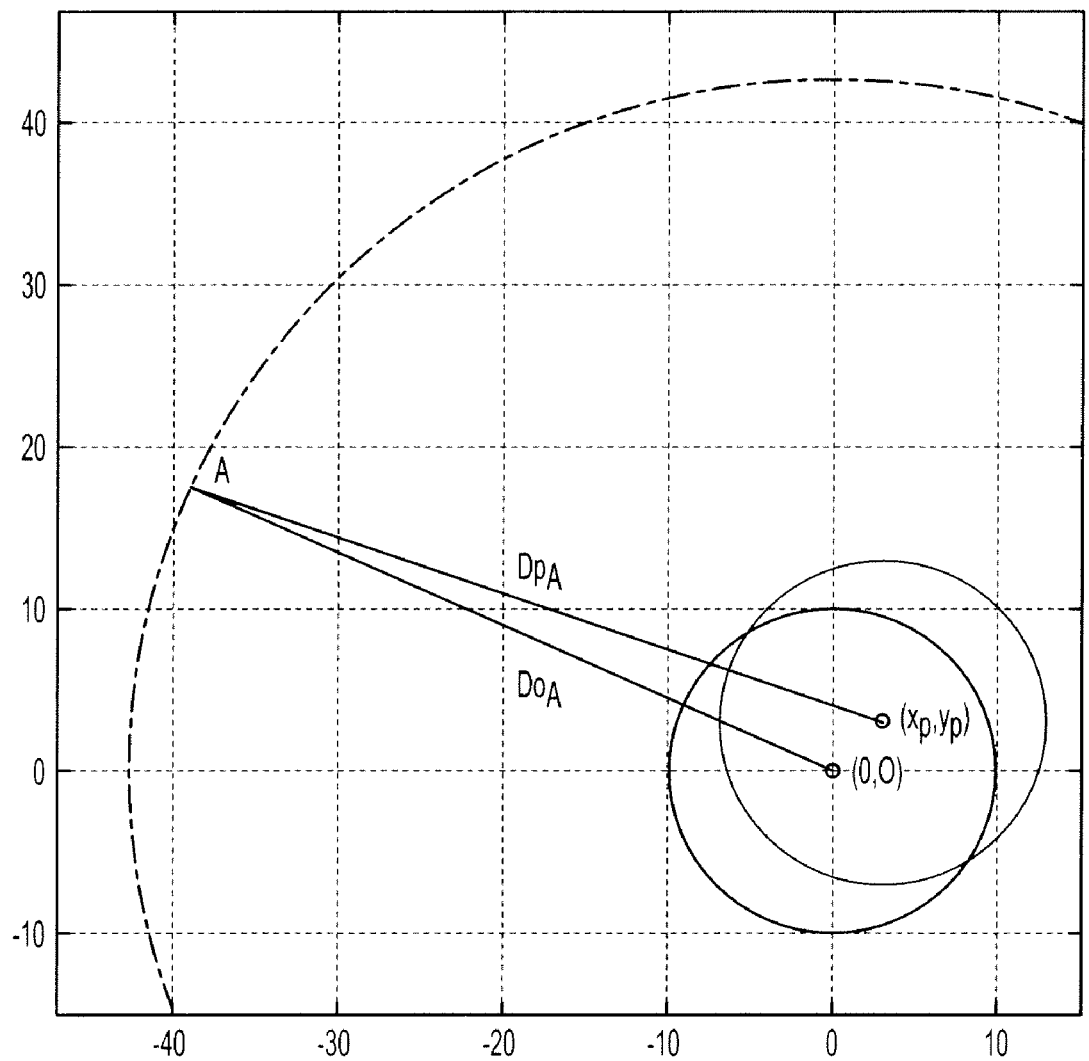
FIG. 4 is a partial two-dimensional front view of a ring detector in which a phantom is not placed at the center of the ring detector.

FIG. 4 is a partial two-dimensional front view of a ring detector in which a phantom 210 is not placed at the center of the ring detector 205. In a non-TOF time alignment, a system that calibrates a non-TOF time alignment can define the center of the coincidence window for all LORs where a uniform phantom 210 does not have to be placed exactly at the center of the coincidence window for all LORs. Therefore, phantom placement is not critical for non-TOF time alignment.

On the contrary, a TOF PET system 100 collects line of responses (LORs) and also the position of the event on the LORs. Therefore any error in defining the coincidence window center, relative to the gantry center, can result in a position error in the field of view (FOV). It is necessary, therefore, to precisely center the phantom or account for any centering error in the time alignment algorithm. Since there is not a fast and easy way to guarantee phantom placement in the center, we have added this error into our system of equations.

An off-centered correction value for an off-centered phantom for any crystal A, $O\rho_A$, can be calculated as the difference in the expected distance to the phantom at the center or origin of the scanner, $Do_A$, and the actual distance to the phantom center, $D\rho_A$, as shown in Equations 6 and 7 below.

$$O\rho_A = Do_A - D\rho_A \quad \text{(Eq. 6)}$$

$$D\rho_A = \sqrt{(x_A - x_p)^2 + (y_A - y_p)^2} \quad \text{(Eq. 7)}$$

where $Do_A$ can equal 427.6 mm, $(x_A, y_A)$ is the coordinate for the location of crystal A and $(x_p, y_p)$ is the coordinate for the location of the phantom. The TOF events can be pre-corrected with off-centered correction value, $O\rho_A$, as shown in Equation 8 below.

$$\text{Pre-corrected } TOF_A = TOF_A - O\rho_A \quad \text{(Eq. 8)}$$

The time offset for each crystal can be calculated using the corrected TOF events and iterative equation, i.e., Equation 4.

Figure 5:
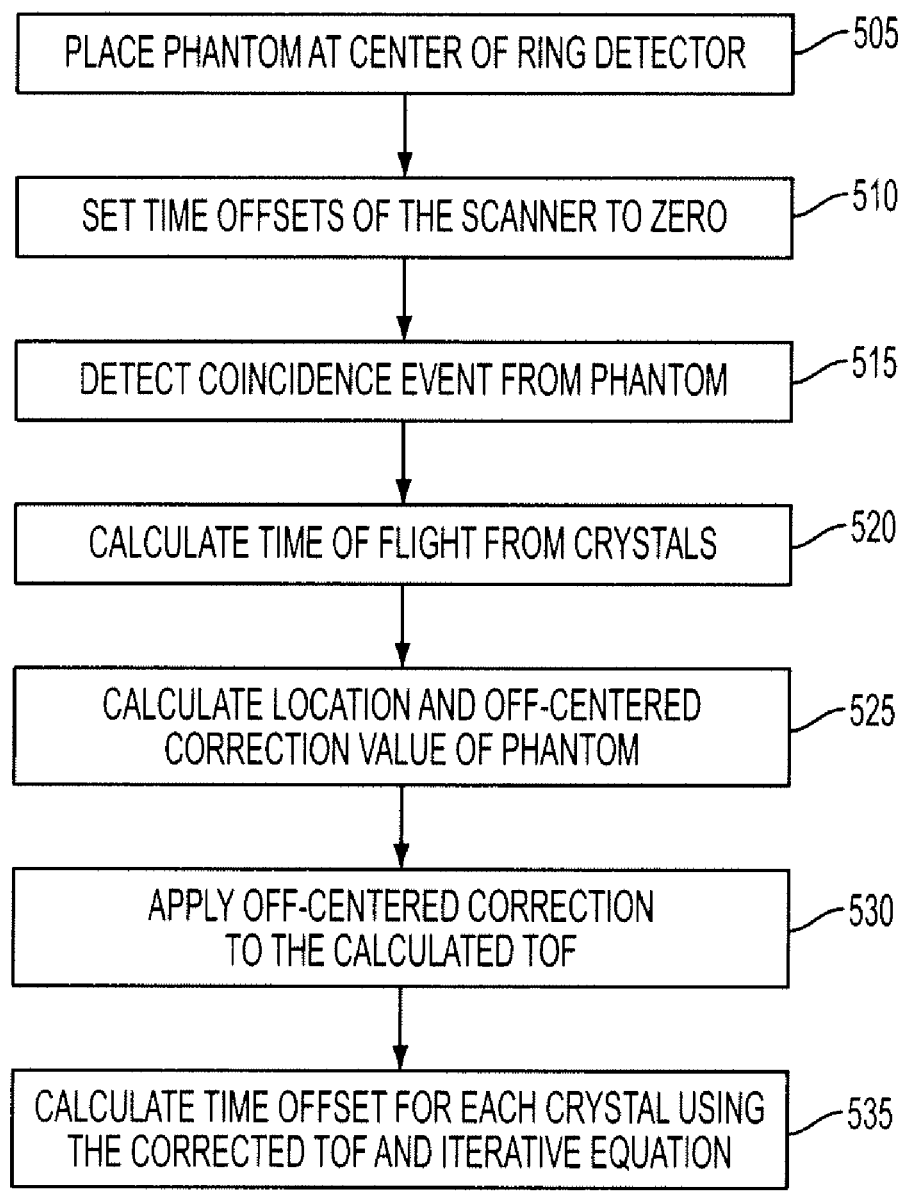
FIG. 5 is a flow diagram that illustrates an embodiment of the architecture, functionality, and/or operation of a positron emission tomography system in accordance with an implementation of the present disclosure.

FIG. 5 is a flow diagram that illustrates an embodiment of the architecture, functionality, and/or operation of a positron emission tomography system 100 (FIG. 1) in accordance with an implementation of the present disclosure. To begin, a phantom 210 (FIG. 2) is placed at the center of the ring detector 205 (FIG. 2) and the time offsets of the TOF PET detector 105 (FIG. 1) is set to zero. (See blocks 505 and 510). The time alignment calibration manager 135 (FIG. 1) detects the coincidence events from the phantom 210 and calculates the time of flight event from the crystals, e.g., crystals A and B, as described in connection with Equations 1 and 2. (See blocks 515 and 520).

Then, the time alignment calibration manager 135 calculates the location of the off-centered phantom 210 and calculates an off-centered correction value for the crystal, as described in connection with Equations 6 and 7. (See blocks 525 and 530). Next, the time alignment calibration manager 135 calculates the time offset for each crystal using the corrected TOF event and iterative equation, as described in connection with Equation 4. (See block 535).

It should be noted that any process descriptions or blocks in flowcharts should be understood as representing modules, segments, or portions of code which include one or more executable instructions for implementing specific logical functions or steps in the process. As would be understood by those of ordinary skill in the art of the software development, alternate embodiments are also included within the scope of the disclosure. In these alternate embodiments, functions may be executed out of order from that shown or discussed, including substantially concurrently or in reverse order, depending on the functionality involved.

The systems and methods disclosed herein can be implemented in software, hardware, or a combination thereof. In some embodiments, the system and/or method is implemented in software that is stored in a memory and that is executed by a suitable microprocessor (μP) situated in a computing device. However, the systems and methods can be embodied in any computer-readable medium for use by or in connection with an instruction execution system, apparatus, or device. Such instruction execution systems include any computer-based system, processor-containing system, or other system that can fetch and execute the instructions from the instruction execution system. In the context of this disclosure, a "computer-readable medium" can be any means that can contain, store, communicate, propagate, or transport the program for use by, or in connection with, the instruction execution system. The computer readable medium can be, for example, but not limited to, a system or propagation medium that is based on electronic, magnetic, optical, electromagnetic, infrared, or semiconductor technology.

Specific examples of a computer-readable medium using electronic technology would include (but are not limited to) the following: an electrical connection (electronic) having one or more wires; a random access memory (RAM); a read-only memory (ROM); an erasable programmable read-only memory (EPROM or Flash memory). A specific example using magnetic technology includes (but is not limited to) a portable computer diskette. Specific examples using optical technology include (but are not limited to) optical fiber and compact disc read-only memory (CD-ROM).

Note that the computer-readable medium could even be paper or another suitable medium on which the program is printed. Using such a medium, the program can be electronically captured (using, for instance, optical scanning of the paper or other medium), compiled, interpreted or otherwise processed in a suitable manner, and then stored in a computer memory. In addition, the scope of the certain embodiments of the present disclosure includes embodying the functionality of the preferred embodiments of the present disclosure in logic embodied in hardware or software-configured mediums.

This description has been presented for purposes of illustration and description. It is not intended to be exhaustive or to limit the disclosure to the precise forms disclosed. Obvious modifications or variations are possible in light of the above teachings. The embodiments discussed, however, were chosen to illustrate the principles of the disclosure, and its practical application. The disclosure is thus intended to enable one of ordinary skill in the art to use the disclosure, in various embodiments and with various modifications, as are suited to the particular use contemplated. All such modifications and variation are within the scope of this disclosure, as determined by the appended claims when interpreted in accordance with the breadth to which they are fairly and legally entitled.

Therefore, having thus described the disclosure, at least the following is claimed:

1. A positron emission tomography (PET) calibration system comprising:
    a PET scanner having a ring detector;
    a phantom that is placed at approximately the center of the ring detector; and
    a time alignment calibration manager that performs the following:
    detecting coincidence events from the phantom,
    calculating positions of time of flight events from the ring detector based on the detected coincidence events,
    calculating time offsets for the ring detector using a mean value calculation based on the calculated positions of the time of flight events,
    wherein the time alignment calibration manager further calculates an off-centered correction value of the phantom and applies the off-centered correction value to the calculated positions of the time of flight events, and
    wherein the mean value calculation is an iterative computation process, and includes a correction value for the time offset.

2. The positron emission tomography calibration system of claim 1, wherein the off-centered correction value for an off-centered phantom is a difference in an expected distance to the phantom at the center or origin of the PET scanner and an actual distance to a phantom center.

3. A positron emission tomography (PET) system comprising:
    a PET scanner having a ring detector;
    a phantom that is placed at approximately the center of the ring detector; and
    a PET calibration unit that includes a time alignment calibration manager that performs the following:
    detecting coincidence events from the phantom,
    calculating positions of time of flight events from the ring detector based on the detected coincidence events,
    calculating time offsets for the ring detector using a mean value calculation based on the calculated positions of the time of flight events
    wherein the time alignment calibration manager further calculates an off-centered correction value of the phantom and applies the off-centered correction value to the calculated positions of the time of flight events,
    wherein the mean value calculation is an iterative computation process, and
    wherein the mean value calculation includes a correction value for the time offset.

4. The positron emission tomography system of claim 3, wherein the off-centered correction value for an off-centered phantom is a difference in an expected distance to the phantom at the center or origin of the PET scanner and an actual distance to a phantom center.

5. A method for calibrating a time alignment for a time of flight (TOF) positron emission tomography (PET) scanner comprising:

placing a phantom at the center of a ring detector of the PET scanner;

setting time offsets of the PET scanner to zero;

detecting coincidence events from the phantom;

calculating positions of time of flight events from the ring detector based on the detected coincidence events;

calculating time offsets for the ring detector using a mean value calculation based on the calculated positions of the time of flight events;

calculating an off-centered correction value of the phantom;

applying the off-centered correction value to the calculated positions of the time of flight events;

implementing the mean value calculation in an iterative computation process; and including a correction value for the calculated positions of the time of flight events in the mean value calculation of the time offset.

6. A positron emission tomography calibration system comprising:

a processing device; and a computer-readable medium including a time alignment calibration manager which has instructions that are executed by the processing device, the instructions including:

detecting coincidence events from a phantom;

calculating positions of the time of flight events from a ring detector based on the detected coincidence events;

calculating time offsets for the ring detector using a mean value calculation based on the calculated positions of the time of flight events;

calculating an off-centered correction value of the phantom;

applying the off-centered correction value to the calculated position of the time of flight events implementing the mean value calculation in an iterative computation process; and including a correction value for the calculated positions of the time of flight events in the mean value calculation of the time offset.

* * * * *